United States Patent [19]

May

[11] Patent Number: 4,658,126
[45] Date of Patent: Apr. 14, 1987

[54] CHECK IDENTIFICATION SYSTEM

[76] Inventor: Joseph A. May, 400 E. Redbridge Rd., Kansas City, Mo. 64131

[21] Appl. No.: 793,840

[22] Filed: Nov. 10, 1985

[51] Int. Cl.[4] .................................... G06K 19/00
[52] U.S. Cl. .................................... 235/487; 235/493
[58] Field of Search ............................. 235/487, 493

[56] References Cited

U.S. PATENT DOCUMENTS 3,285,277  6/1966  Schuster ........................ 235/487 X Primary Examiner—Harold I. Pitts
Attorney, Agent, or Firm—Thomas M. Scofield

[57] ABSTRACT

Improvements in aids to bad check control; use of a copying machine to print driver's licenses, state identification cards, social security cards or the like on the backside of a check when it is written; personalizing and identifying checks by copying identification cards on the backside of the check when the check is accepted; improvements in processes of check identification marking in aid of collection of bad checks.

6 Claims, 6 Drawing Figures

CHECK IDENTIFICATION SYSTEM

BACKGROUND OF THE INVENTION

The problem is bad checks and the difficulties of legally enforcing litigation seeking to collect on such. Typically, a businessman who receives a check from a customer, known or not, if there is any question of identity or validity of the check, will copy, onto the check, information from identification demanded of the check writer. Typically such information may include a driver's license number, perhaps information from a state identification card, a social security number, other information or any combination of these.

However, in trying to collect on a bad check, many problems can arise. One of these, particularly, is tying the check writer to the copied identification data. If any one number has been copied incorrectly, then the collection effort generally fails.

What the subject invention seeks to do and operates to do is to provide a means and method for placing absolutely positive identification on the check itself so that both (1) pertinent data identifying the check writer and (2) his photograph actually appear on the check. Perhaps it should be noted that while a bad or returned check is going to come back to the check receiver anyway, in the subject case he will get, in return, the bounced check, with the I.D. image thereon.

OBJECTS OF THE INVENTION

A first object of the invention is to provide means of and methods for aiding the problem of collecting and legally enforcing collection of bad checks.

Another object of the invention is to provide means of and methods for placing on a check, as it is received, absolutely positive identification, including, as examples, reproductions of a driver's license, a state identification card, a social security card or the like with the full information on the face of each one of these items reproducible on the backside of the check.

Still another object of the invention is to provide checks for passing through the banking system with full identification of the check writer placed upon the backside of the check from common written sources of identification.

Other and further objects of the invention will appear in the course of the following descriptions thereof.

THE DRAWINGS

In the drawings, which form a part of the instant specification and are to be read in conjunction therewith, embodiments of the invention are shown and, in the various views, like numerals are employed to indicate like parts.

THE PRIOR ART

Applicant is aware of the following patents directed to check identification:

Chadwick et al U.S. Pat. No. 1,483,926 issued Feb. 19, 1924 for "Check Guaranty Certificate";

Opitz U.S. Pat. No. 1,388,433 "Checkbook", issued Nov. 24, 1931;

Goldwater U.S. Pat. No. 2,462,735 "Photo Identification For Checks", issued Feb. 22, 1949;

Krueger U.S. Pat. No. 2,736,114 "Machine For Taking Fingerprints", issued Feb. 28, 1956;

Elmore U.S. Pat. No. 2,868,069 "Fingerprint And Document Copying Device", issued Jan. 13, 1969; and Schuster U.S. Pat. No. 3,258,277 "Checkbook-Personalized Check Identification By Means Of Photograph", issued June 28, 1966.

Figure 1:
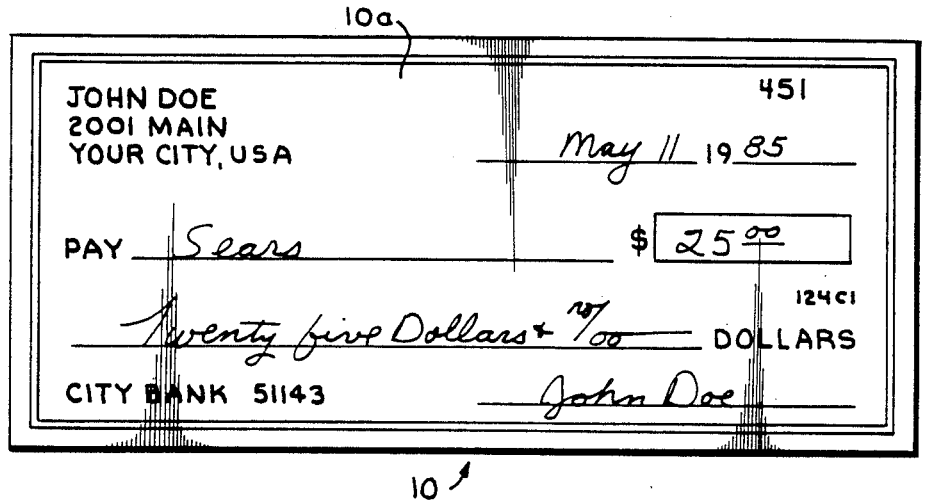
FIG. 1 is a vertical plan view of the front face of an executed check of relatively conventional form, comprising a personal check.
Figure 6:
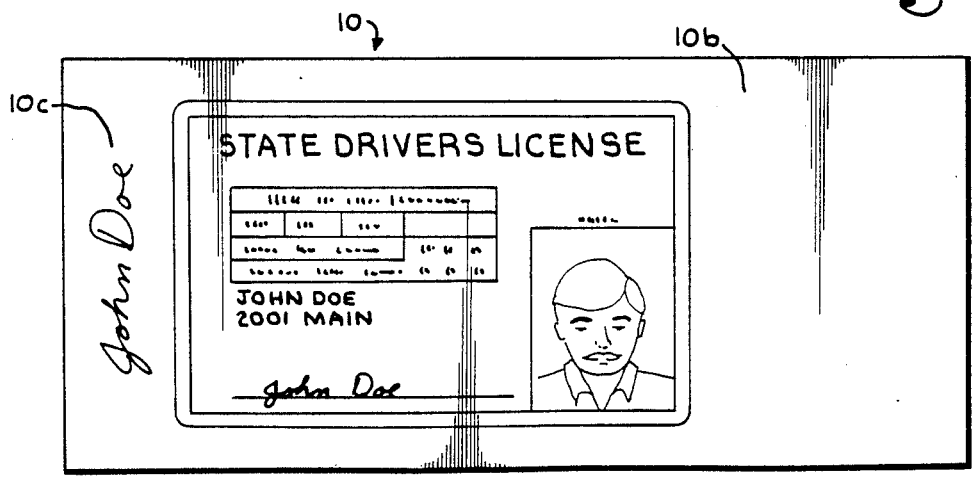
FIG. 6 is a picture of the reverse side of the check of FIG. 1 with the driver's license front face duplicated thereon adjacent the endorsement edge of the check.

Turning to FIG. 1, at 10 there is seen a personal check of relatively conventional form. The front face is designated 10a. In FIG. 6 the rear face of the same check is designated 10b, with the endorsement end thereof designated 10c.

Figure 2:
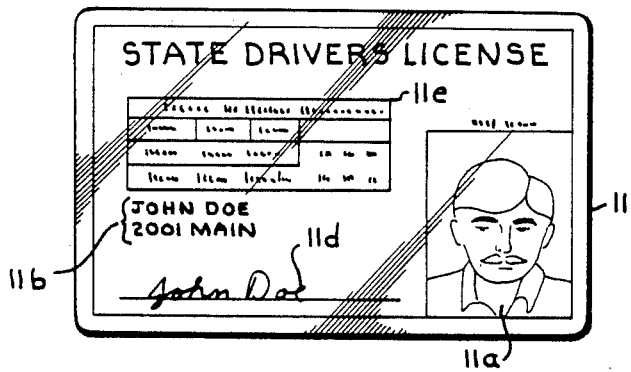
FIG. 2 is a vertical plan view of the front face of a state driver's license showing indicia, signature, photograph and the like in stylized fashion.

In FIG. 2, 11 generally designates the front face of a typical state driver's license. While the informational content of state drivers' licenses presumably varies, in addition to a photograph of the driver, typical other information may include: class of the driver's license, the license number itself, date of birth of the driver, the date of expiration of the driver's license, sex of the driver, the eye color of the driver, height and weight of the driver, etc. Yet further, a driver's license carries the signature of the driver himself, an important point with respect to comparison of the signature on the front face of the check. The driver's photograph is indicated at 11a, the home address at 11b and the array of tabulated information with respect to the license and the driver at 11c. The driver's signature is seen at 11d.

Figure 3:
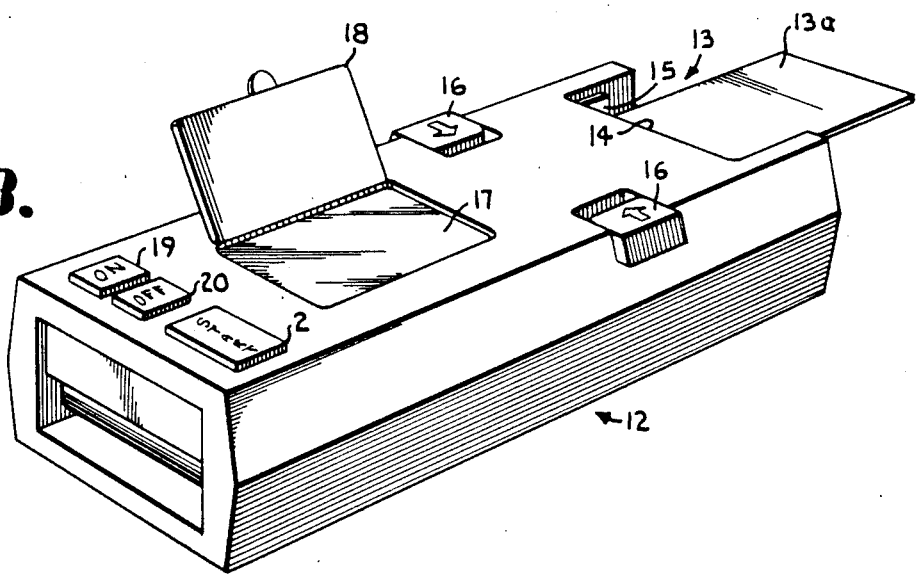
FIG. 3 is a three-quarter perspective view from above of a miniaturized image transfer machine for transferring the image of, say, a driver's license to the backside of the check. The screen to receive the driver's license is shown open for receipt thereof.
Figure 4:
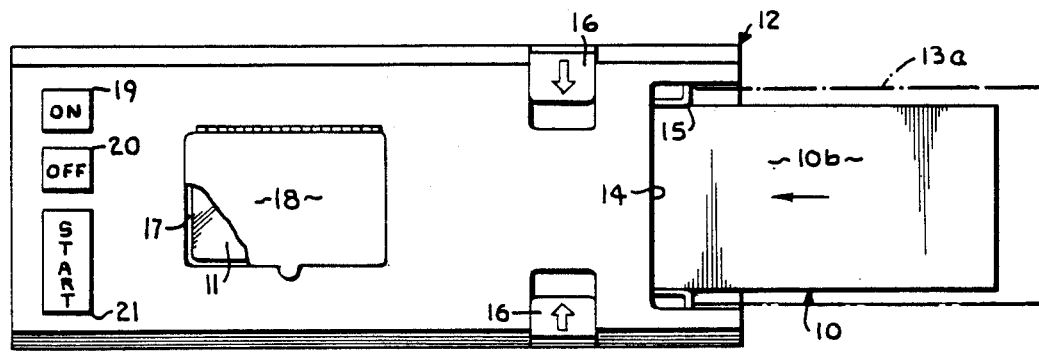
FIG. 4 is a top plan view of the device of FIG. 3 with the driver's license mounted on the screen for copying and, at the right hand side of the device, the check being fed between two adjustable guides into the copying machine.
Figure 5:
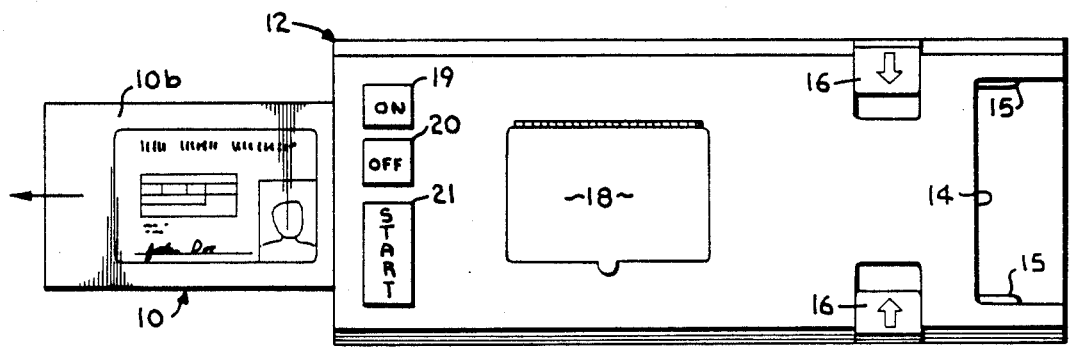
FIG. 5 shows the device of FIGS. 3 and 4 ejecting the printed check with the information from the state driver's license front face printed on the backside thereof.

A copying/image transferring device is seen in FIGS. 3–5, inclusive. It should be understood that many standard copying machines will perform the function which is illustrated with respect to this small, counter size machine. That function is typically referred to as by-pass copying. The point is that there is no desire to make an actual copy of the check at the time of its receipt by the payee. If the check is not going to bounce or be returned, then the payee does not want to see it again. If the check does bounce or it is returned, the payee will receive it back, automatically, from his bank.

Accordingly, the purpose of the device of FIGS. 3–5, inclusive is to take the payer's check and print the image of the front face of the payer's drivers license (or analogous card) on the backside of the check. The check is then received by the payee and passed into the payee's usual banking function. If there are inadequate funds for the bank to pay the check, then the check is returned to the payee with the indication that insufficient funds are available for payment.

Turning to the image transfer device of FIGS. 3–5, inclusive, the device itself is generally designated 12. It has an input end 13 which includes a flat receiving table 13a, this passing into opening 14. Size adjustable member 15 are meant to closely fit various sizes of checks and are controlled in their position by fingertip adjusters 16. Arms 15 serve to center the check for feeding through the reproductive part of the machine.

Transparency 17 has cover 18 and is sized to receive standard identification cards such as social security cards, state identification cards, state driver's licenses and the like. Control buttons 19 and 20 turn the device on and off, while control button 21 starts the image transfer process where the check 10 is engaged by rollers within the machine to move it through the machine and into a position where standard and conventional image reproducers can transfer the image of the front face of the state drivers license to the blank rear face of the check 10.

It is important to note that this process of image transfer is not new to the machine illustrated in FIGS. 3–5, inclusive. This, for specific example, is the by-pass copying to be carried out in the Ricoh FT3020 machine by opening the Ricoh FT3020 by-pass feed table. Copying in such case may be made from the main glass onto manually fed single sheets and odd sizes of paper, including checks. What is shown, then, in FIGS. 3–5, inclusive, is a miniaturized Ricoh FT3020 without paper trays and only a by-pass feed table for passing paper into the machine.

It should be understood that a Ricoh FT3020 could be fully illustrated, as an example of a copying machine able to perform the function described, by utilizing only the by-pass copying and by-pass feed table inherent in the said Ricoh machine. Rather than duplicate the entire copying machine, applicant has shown a device incorporating only the by-pass copying feature and by-pass feed table of the Ricoh device.

FIG. 5 shows the check 10, imprinted on the backside thereof with the information from the face of the state driver's license emerging from the image transferring device.

With this imagery integral with the check, the payee may now more readily accept the check realizing that his task of collecting or litigating the check, if bad, will be greatly expedited by the additional information provided on the check.

By-pass copying on the Ricoh FT3020 machine, utilizing the by-pass feed table is described and illustrated on pages 9–12, inclusive of the operating instruction booklet for the Ricoh FT 3020. The business home address of Ricoh Company, Ltd. is 15-5, 1 Chome, Minami-Aoyama, Minato-Ku, Tokyo, Japan.

Other copying machines than the specific one noted will perform this same function, specifically, that of image transfer or copying onto small size pieces of paper not fed through the conventional size paper trays of a copying machine.

From the foregoing, it will be seen that this invention is one well adapted to attain all of the ends and objects hereinabove set forth together with other advantages which are obvious and which are inherent to the process.

It will be understood that certain process features, steps and sub-combinations thereof are of utility and may be employed without reference to other features, steps and process subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A process of marking a check having a front and back side thereof with identification indicia comprising the steps of running the check through a copying machine and transferring the image of one side of an identification card to the back side of the check.

2. A process as in claim 1 wherein the identification card is a state driver's license.

3. A process of marking a check having a front and back side thereof with identification indicia comprising applying the image of one side of an identification card to the back side of the check.

4. A process as in claim 3 wherein the identification card is a state driver's license.

5. A check having a front and back side thereof, said check having the image of one side of an identification card on the back side of the check.

6. A check as in claim 5 wherein the identification card is a state driver's license.

* * * * *